United States Patent
Masago

(10) Patent No.: US 10,684,161 B2
(45) Date of Patent: Jun. 16, 2020

(54) TIRE LOAD ESTIMATION METHOD AND TIRE LOAD ESTIMATION DEVICE

(71) Applicant: BRIDGESTONE CORPORATION, Tokyo (JP)

(72) Inventor: Takeshi Masago, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 134 days.

(21) Appl. No.: 16/078,951

(22) PCT Filed: Mar. 10, 2017

(86) PCT No.: PCT/JP2017/009797
§ 371 (c)(1),
(2) Date: Aug. 22, 2018

(87) PCT Pub. No.: WO2017/155112
PCT Pub. Date: Sep. 14, 2017

(65) Prior Publication Data
US 2019/0025113 A1    Jan. 24, 2019

(30) Foreign Application Priority Data
Mar. 11, 2016  (JP) ................................. 2016-048774

(51) Int. Cl.
*B60C 23/04* (2006.01)
*G01M 17/02* (2006.01)
(Continued)

(52) U.S. Cl.
CPC ............. *G01G 19/03* (2013.01); *B60C 23/04* (2013.01); *G01G 19/08* (2013.01); *G01L 5/00* (2013.01); *G01M 17/02* (2013.01); *B60C 19/00* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,641,900 A * 6/1997 Di Bernardo ......... G01L 17/005
73/146
6,704,636 B2 * 3/2004 Amano .................. B60T 8/172
374/E7.042
(Continued)

FOREIGN PATENT DOCUMENTS

CN         1758046 A     4/2006
CN       101228423 A     7/2008
(Continued)

OTHER PUBLICATIONS

Communication dated Feb. 22, 2019 from the European Patent Office in application No. 1776344.1.
(Continued)

*Primary Examiner* — Andre J Allen
(74) *Attorney, Agent, or Firm* — Sughrue Mion, PLLC

(57) ABSTRACT

In order to provide a method and a device capable of precisely estimating a load acting on a tire with less sensors, a load estimation device 10 for estimating the load acting on the tire is provided with: an acceleration sensor 11; an acceleration waveform detection means 13 that detects an acceleration waveform in a tire radial direction on the basis of an output of the acceleration sensor 11; a differential acceleration waveform computing means 14 that differentiates the acceleration waveform to obtain a differential acceleration waveform; a peak position detection means 15 that detects a position of a peak on a leading edge side and a position of a peak on a trailing edge side appearing in the differential acceleration waveform; a ground contact time ratio calculation means 16 that calculates a ground contact
(Continued)

time and a rotation time on the basis of the peak positions and calculates a ground contact time ratio, which is a ratio between the calculated ground contact time and the rotation time; and a load estimation means 19 that estimates the load acting on the tire on the basis of the calculated ground contact time ratio and a K-W map 18M representing a relationship between the calculated ground contact time ratio stored in a storage means 18 and the load.

8 Claims, 8 Drawing Sheets

(51) Int. Cl.
  *G01G 19/03* (2006.01)
  *G01G 19/08* (2006.01)
  *G01L 5/00* (2006.01)
  *B60C 19/00* (2006.01)
(58) Field of Classification Search
  CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
  USPC .................................................. 73/146–146.8
  See application file for complete search history.

(56) References Cited

U.S. PATENT DOCUMENTS

| | | | |
|---|---|---|---|
| 2005/0155685 A1* | 7/2005 | Daval | B60C 11/00 152/152.1 |
| 2006/0074535 A1 | 4/2006 | Gim et al. | |
| 2008/0016955 A1* | 1/2008 | Merino-Lopez | B60C 11/00 73/146 |
| 2008/0184577 A1 | 8/2008 | Spratte et al. | |
| 2010/0071453 A1* | 3/2010 | Isono | G01M 17/021 73/146 |
| 2011/0132081 A1* | 6/2011 | Lee | B60C 23/0416 73/146.5 |
| 2013/0116972 A1 | 5/2013 | Hanatsuka et al. | |
| 2013/0125639 A1 | 5/2013 | Lemineur | |
| 2015/0007645 A1 | 1/2015 | Merino Lopez et al. | |
| 2015/0135812 A1* | 5/2015 | Kuwayama | G01M 17/022 73/146 |

FOREIGN PATENT DOCUMENTS

| | | |
|---|---|---|
| CN | 102498000 A | 6/2012 |
| CN | 103003110 A | 3/2013 |
| CN | 104114994 A | 10/2014 |
| EP | 1757464 A1 | 2/2007 |
| EP | 2172759 A1 | 4/2010 |
| EP | 2679411 A2 | 1/2014 |
| EP | 2679411 A3 | 1/2014 |
| JP | 2005-205956 A | 8/2005 |
| JP | 2010-159031 A | 7/2010 |
| JP | 2012-218682 A | 11/2012 |
| JP | 2013-536109 A | 9/2013 |
| WO | 2007/030700 A2 | 3/2007 |
| WO | 2015133155 A1 | 9/2015 |
| WO | 2016/009601 A1 | 1/2016 |

OTHER PUBLICATIONS

Huang, You et al., "Design and Realization of Tire Pressure Monitoring System based on SP37", Instrument Technique and Sensor, 2013, No. 12, pp. 144-147 (total 4 pages).
Communication dated Nov. 20, 2019 from the State Intellectual Property Office of the P.R.C. in counterpart Application No. 2017800161556.
International Preliminary Report on Patentability with translation of Written Opinion dated Sep. 20, 2018 from the International Bureau in counterpart application No. PCT/JP2017/009797.
International Search Report for PCT/JP2017/009797, dated May 30, 2017.

* cited by examiner

ACCELARATION[G]

DIFFERENTIAL
ACCELARATION
[G/sec]

GROUND CONTACT
TIME RATIO K

INTERNAL PRESSURE P[kPa]

$K = K_0 - m(P - P_0)$

GROUND CONTACT
TIME RATIO K

ESTIMATED LOAD W[kg]

NEW(14mm)

WORN(3mm)

TIRE LOAD ESTIMATION METHOD AND TIRE LOAD ESTIMATION DEVICE

CROSS REFERENCE TO RELATED APPLICATIONS

This Application is a National Stage of International Application No. PCT/JP2017/009797 filed Mar. 10, 2017, claiming priority based on Japanese Patent Application No. 2016-048774 filed Mar. 11, 2016.

TECHNICAL FIELD

The present invention relates to a method for estimating a load acting on a tire by using an output signal of an acceleration sensor disposed on an inner surface side of a tire tread, and a device for estimating the load acting on the tire.

BACKGROUND

Conventionally, there has been proposed a method for estimating a load acting on a tire, in which a plurality of piezoelectric elements for detecting a change of the load in a circumferential direction and a plurality of piezoelectric elements for detecting a change of the load in a width direction, the load acting on the tire during traveling of a vehicle, are arranged on an inner surface side of a tire tread, and in which a ground contact area of the tire is calculated on the basis of a ground contact length in the circumferential direction of the tire, which is detected from the change of the load in the circumferential direction and a ground contact width in the width direction of the tire, which is detected from the change of the load in the width direction, an air pressure of the tire is measured, and on the basis of the measured air pressure and the calculated ground contact area, the load acting on the tire is estimated (see PTL 1, for example).

CITATION LIST

Patent Literature

PTL 1: Japanese Unexamined Patent Application Publication No. 2012-218682

SUMMARY OF THE INVENTION

Problem to be Solved by the Invention

However, in the method described in PTL 1, since the change of the load in the circumferential direction and the change of the load in the width direction are detected, it has been necessary to arrange a plurality of sensors (piezoelectric elements) on the inner surface side of a tire thread. Also, in PTL 1, because the load is estimated using the ground contact area even though the air pressure is taken into consideration, the load estimation accuracy has not been sufficient.

The present invention has been made in view of the conventional problem, and aims at providing a method and a device for accurately estimating a load acting on a tire with less sensors.

Means for Solving the Problem

One aspect of the present invention relates to a method for estimating a load acting on a tire, including: a step of detecting an acceleration waveform of the tire in a tire radial direction from an output of an acceleration sensor disposed on an inner surface side of a tire tread; a step of differentiating the acceleration waveform in the tire radial direction to obtain a differential acceleration waveform; a step of calculating a ground contact time and a rotation time of the tire from the differential acceleration waveform; a step of calculating a ground contact time ratio which is a ratio between the ground contact time and the rotation time; and a step of estimating the load acting on the tire from the calculated ground contact time ratio.

In this way, since the load acting on the tire is estimated from the ground contact time and the rotation time calculated using the acceleration waveform in the tire radial direction detected from the output of the acceleration sensor, the load acting on the tire can be estimated accurately with less sensors.

Another aspect of the present invention relates to a device for estimating a load acting on a tire, including: an acceleration sensor disposed on an inner surface side of a tire tread and configured to detect acceleration of a tire in a tire radial direction; an acceleration waveform extracting means that extracts an acceleration waveform in the tire radial direction including a vicinity of a contact patch, from an output signal of the acceleration sensor; a differential computing means that differentiates the acceleration waveform in the tire radial direction to obtain a differential acceleration waveform; a peak position detecting means that detects a leading edge side peak position and a trailing edge side peak position, which appear in the differential acceleration waveform and are peak positions of two ground contact ends; a ground contact time calculation means that calculates a ground contact time which is an interval between the leading edge side peak position and the trailing edge side peak position; a rotation time calculation means that calculates a rotation time which is a time when the tire is rotated by one rotation from an interval between two adjacent leading edge side peak positions in the radial direction acceleration waveform or from an interval between two adjacent trailing edge side peak positions in the radial direction acceleration waveform; a ground contact time ratio calculation means that calculates a ground contact time ratio which is a ratio between the calculated ground contact time and the rotation time; an internal pressure detection means that detects an internal pressure of the tire; a storage means that stores a map representing a relationship among the ground contact time ratio, the internal pressure of the tire and the load acting on the tire; and a load estimation means that estimates the load acting on the tire from the calculated ground contact time ratio, the detected internal pressure of the tire and the map.

By employing such a configuration, a highly accurate tire load estimation device can be realized.

Further, the invention may include a ground contact time ratio correction means that corrects the calculated ground contact time ratio by the detected internal pressure, and the load estimation means may be configured to estimate the load acting on the tire from the corrected ground contact time ratio.

It should be noted that the above-described summary of the invention is not intended to enumerate all the features necessary for the present invention, a sub-combination of these feature groups may also be the invention.

MODE FOR CARRYING OUT THE INVENTION

First Embodiment

Figure 1:
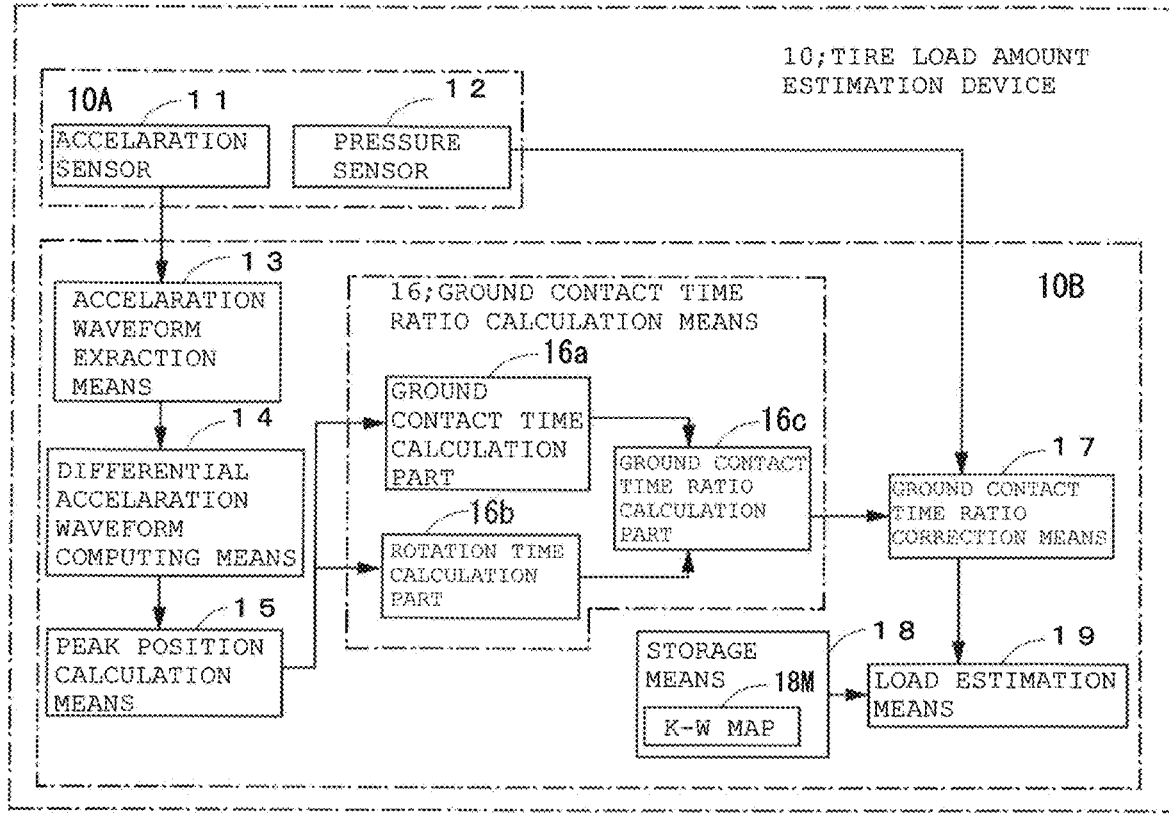
FIG. 1 is a block diagram illustrating a configuration of a tire load estimation device according to a first embodiment of the present invention.

FIG. 1 a block diagram illustrating a configuration of a tire load estimation device 10 according to a first embodiment of the present invention. In FIG. 1, reference numeral 11 denotes an acceleration sensor, 12 denotes a pressure sensor as an internal pressure detection means, 13 denotes an acceleration waveform extraction means, 14 denotes a differential acceleration waveform computing means, 15 denotes a peak position calculation means, 16 denotes a ground contact time ratio calculation means, 17 denotes a ground contact time ratio correction means, 18 denotes a storage means, and 19 denotes a load estimation means.

The acceleration sensor 11 and the pressure sensor 12 constitute a sensor unit 10A, and each means from the acceleration waveform extraction means 13 to the load estimation means 19 and the storage means 18 constitute a storage/computing unit 10B.

The means constituting the storage/computing unit 10B are configured by software of a computer and a storage device such as a random access memory (RAM) or the like, and disposed on a vehicle side (not-shown).

Figure 2:
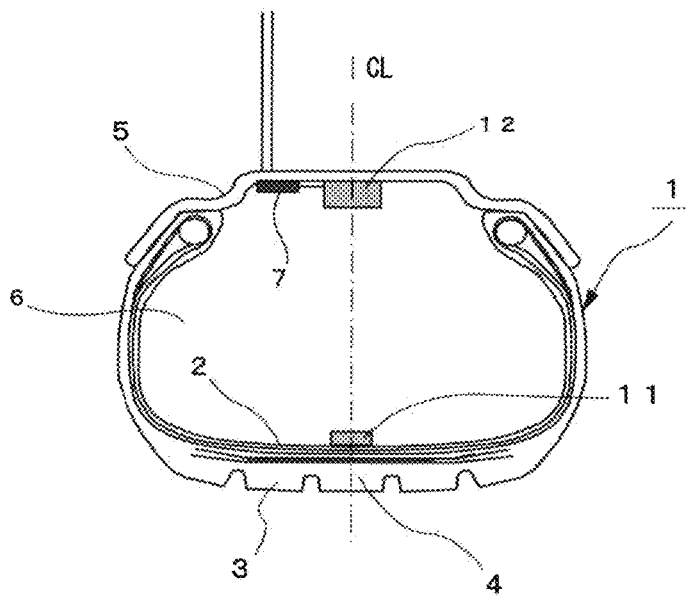
FIG. 2 is a diagram illustrating an example of how an acceleration sensor is attached.

The acceleration sensor 11 is disposed, as shown in FIG. 2, at a center of a tire width direction indicated by CL of an inner liner part 2 of a tire 1, so that a detection direction aligns with a tire radial direction, to thereby detect a tire radial direction acceleration acting on an inner side of a central part 4 of a tire tread 3.

The pressure sensor 12 is disposed on a tire air chamber 6 side of a wheel rim 5, to measure the pressure of air (air pressure P), which is the internal pressure of the tire in the tire air chamber 6.

As a configuration for transmitting output signals of the acceleration sensor 11 and the pressure sensor 12 to the storage/computing unit 10B, for example, as illustrated in FIG. 2, it is preferable to configure such that a transmitter be disposed on the inner liner part 2 or the wheel rim 5, the output signals of the acceleration sensor 11 and the pressure sensor 12 be respectively amplified by amplifiers (not-shown), and thereafter transmitted wirelessly to the storage/computing unit 10B disposed on the vehicle body side (the wiring connecting the acceleration sensor 11 and the transmitter 7 is omitted in FIG. 2).

Alternately, the configuration may be such that the storage/computing unit 10B be provided on the tire 1 side and data of the wear amount estimated by the load estimation means 19 be transmitted to a vehicle controller (not-shown) on the vehicle body side.

The acceleration waveform extraction means 13 extracts, from the tire radial direction acceleration signal output from the acceleration sensor 11, the tire radial direction acceleration waveform (hereinafter referred to as "acceleration waveform") which is a time series waveform of the tire radial direction acceleration in the sensor part 4.

The differential acceleration waveform computing means 14 time-differentiates the acceleration waveform extracted by the acceleration waveform extraction means 13 to obtain the differential acceleration waveform.

Figure 3A:
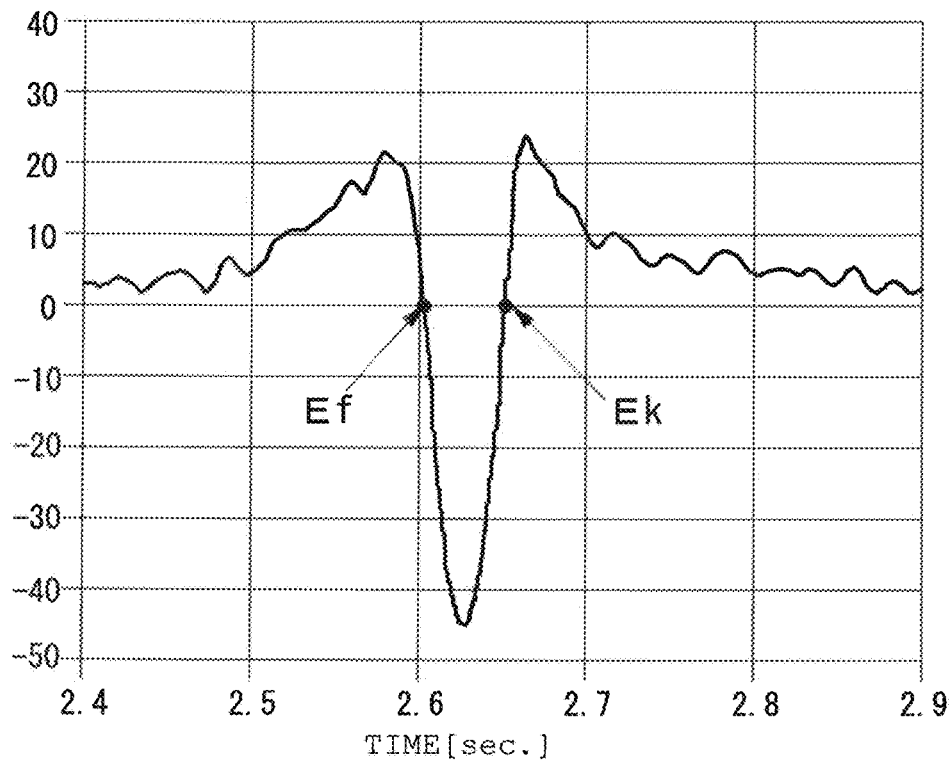
FIGS. 3A and 3B are diagrams respectively illustrating an example of an acceleration waveform and an example of a differential acceleration waveform.

FIG. 3A is a diagram illustrating an example of the radial direction acceleration waveform detected by the acceleration sensor 11, in which the horizontal axis represents time [sec], and the vertical axis represents the magnitude [G] of the acceleration. In the acceleration waveform, the magnitude of the acceleration is zero in two ground contact ends, one of which is a ground contact end on the step-in side indicated by the left-side round mark (hereinafter referred to as leading edge $E_f$) in FIG. 3 and the other one of which is a ground contact end on the kick-out side indicated by the right-side round mark (hereinafter referred to as trailing edge $E_k$) in FIG. 3.

Figure 3B:
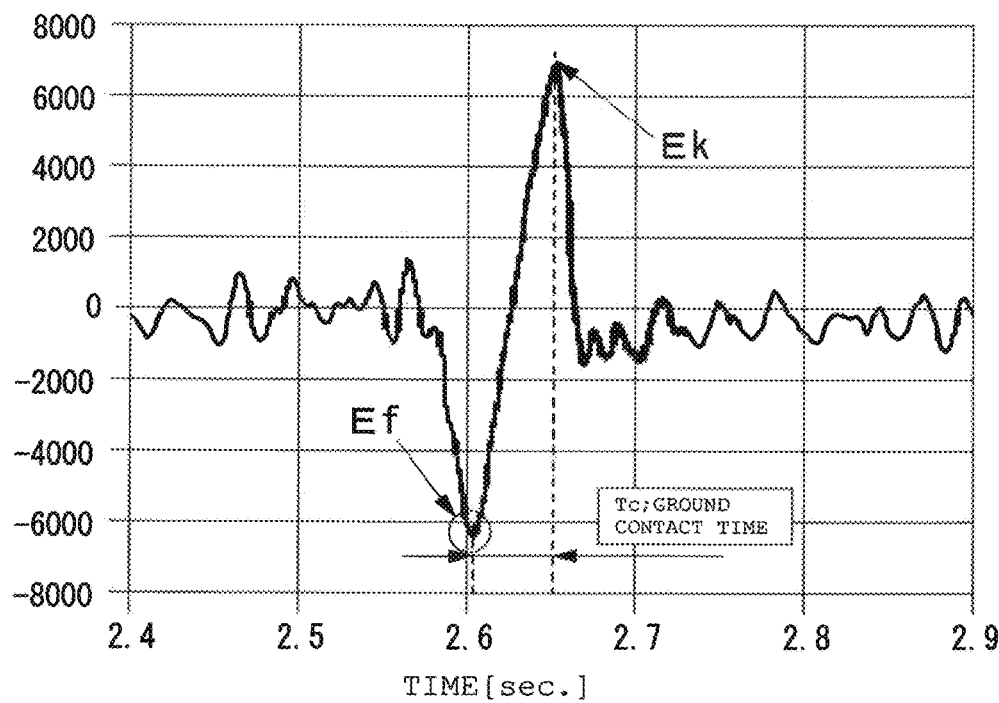

FIG. 3B is a diagram illustrating the differential acceleration waveform obtained by differentiating the acceleration waveform illustrated in FIG. 3A, in which the horizontal axis represents time [sec], and the vertical axis represents the magnitude [G/sec.]. As illustrated in FIG. 3B, large peaks appear on the leading edge $E_f$ and the trailing edge $E_k$.

A tire ground contact time $T_c$ is a time interval between the position of the leading edge $E_f$ and the position of the trailing edge $E_k$ which are zero cross points of the acceleration waveform, however, because it is difficult to accurately determine the interval of the zero points, in the present example, a time interval between a peak position on the step-in side and a peak position on the kick-out side, which are two peak positions in the differential acceleration waveform, is set as the ground contact time $T_c$.

Figure 4:
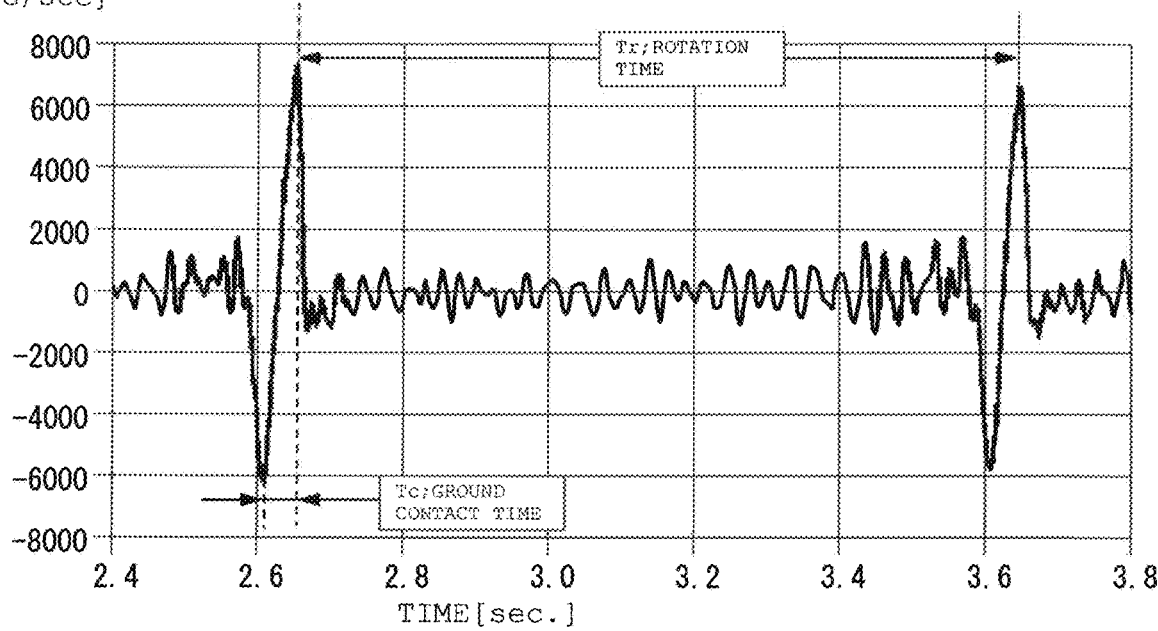
FIG. 4 is a diagram illustrating a relationship among a differential acceleration waveform, a ground contact time and a rotation time.

In the present example, as illustrated in FIG. 4, since a rotation time $T_r$ is also calculated in addition to the ground contact time $T_c$, it is preferable to obtain differential acceleration waveforms for at least equal to or more than two rotations of the tire (actually, it is sufficient to detect at least two peak positions on the step-in side or at least two peak positions on the kick-out side).

The ground contact time ratio calculation means 16 includes a ground contact time calculation part 16a, a rotation time calculation part 16b and a ground contact time ratio calculation part 16c, and calculates a ground contact time ratio $K=T_c/T_r$.

Specifically, the ground contact time calculation part 16a calculates a time interval between the peak position on the step-in side and the peak position on the kick-out side appearing in the differential acceleration waveform shown in FIG. 4, and sends the calculated time interval as the ground contact time $T_c$ to the ground contact time ratio calculation part 16c.

In the meantime, the rotation time calculation part 16b calculates a time interval between two temporally adjacent peaks on the step-in side or a time interval between two temporally adjacent peaks on the kick-out side, and sends the calculated time interval as a rotation time $T_r$ to the ground contact time ratio calculation part 16c.

The ground contact time ratio calculation part 16c calculates the ground contact time ratio $K=T_c/T_r$ using the calculated ground contact time $T_c$ and the rotation time $T_r$, and sends the calculated ground contact time ratio K to the ground contact time ratio correction means 17. The ground contact time ratio K is a ground contact time ratio when the air pressure of the tire 1 is a preset reference air pressure $P_0$, therefore, the calculated ground contact time ratio is hereafter expressed as a ground contact time ratio $K_0$.

The ground contact time ratio correction means 17 corrects, by using the air pressure P measured by the pressure sensor 12, the ground contact time ratio $K_0$ calculated by the ground contact time ratio calculation means 16.

Figure 5:
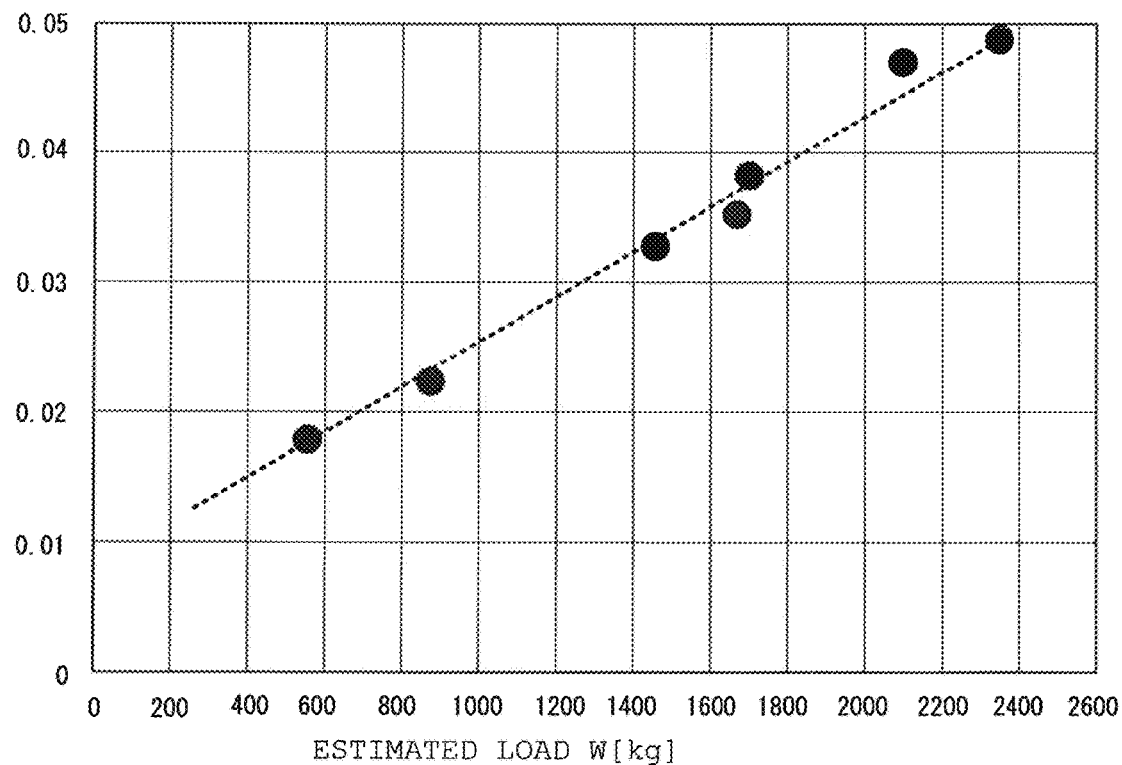
FIG. 5 is a diagram illustrating a relationship between a ground contact time ratio and a load (K-W map)
Figure 6:
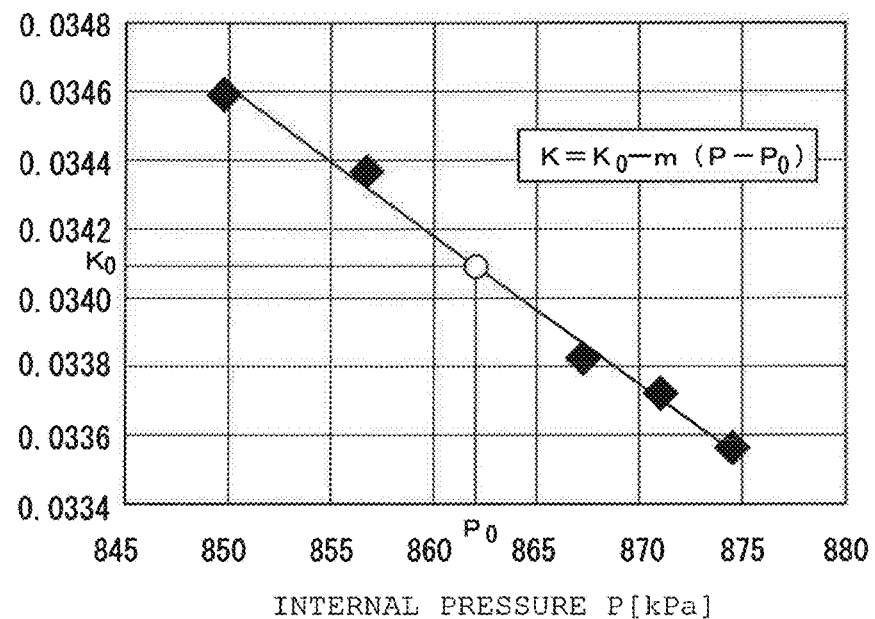
FIG. 6 is a diagram illustrating a relationship between the ground contact time ratio and air pressure.

That is, as shown in FIG. 5, the magnitude of the ground contact time ratio K has a substantially linear relation to the load acting on the tire. Therefore, the heavier the load is, the larger the ground contact time ratio K becomes, however, as shown in FIG. 6, when the internal pressure P becomes high, the ground contact time ratio K becomes small. Accordingly, when the calculated ground contact time ratio $K_0$ is corrected using the air pressure P, the accuracy of estimation of the load can be improved.

Specifically, if the ground contact time ratio when the air pressure is P is assumed to be $K_p$, a relationship between $K_0$ and $K_p$ is represented by the following equation (1):

$$K_p = K_0 + m(P-P_0), m<0 \quad (1)$$

The ground contact time ratio correction means 17 compares the measured air pressure P with the reference ground contact pressure $P_0$, and when the measured air pressure P is deviated from the reference ground contact pressure $P_0$, corrects the ground contact time ratio $K_0$ calculated by the ground contact time ratio calculation means 16 by using the equation (1).

The right-downward straight line representing the relationship between the ground contact time ratio $K_0$ and the air pressure P shown in FIG. 6 is an example when the load W=1450 Kg. However, since the inclination m of the straight line is substantially constant regardless of the load W, the calculated ground contact time ratio $K_0$ can be corrected using the equation (1).

The storage means 18 stores a map (K-W map 18M) representing a relationship between the ground contact time ratio K and the load acting on the tire, as shown in FIG. 5.

Figure 7:
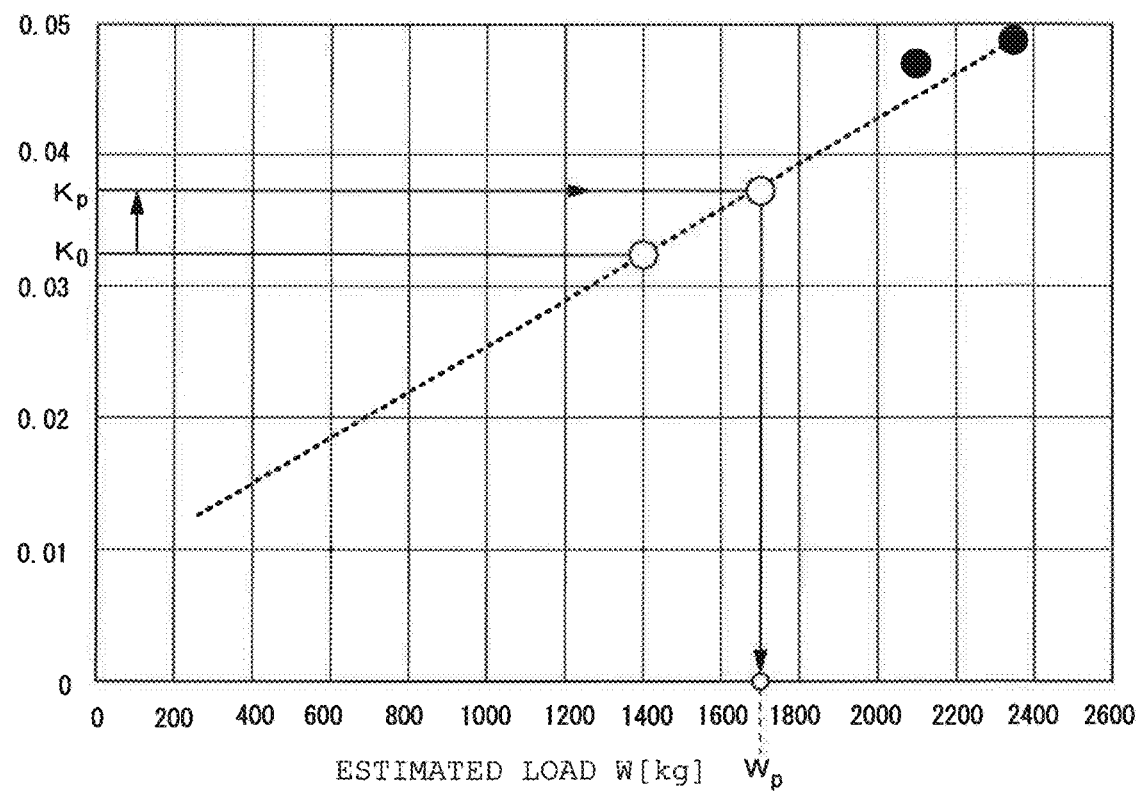
FIG. 7 is a diagram illustrating a method for estimating a load acting on a tire from a corrected ground contact time ratio.

The load estimation means 19 estimates the load $W_p$ acting on the tire 1 from the ground contact time ratio $K_p$ corrected by the ground contact time ratio correction means 17 and the K-W map 18M, as shown in FIG. 7.

Figure 8:
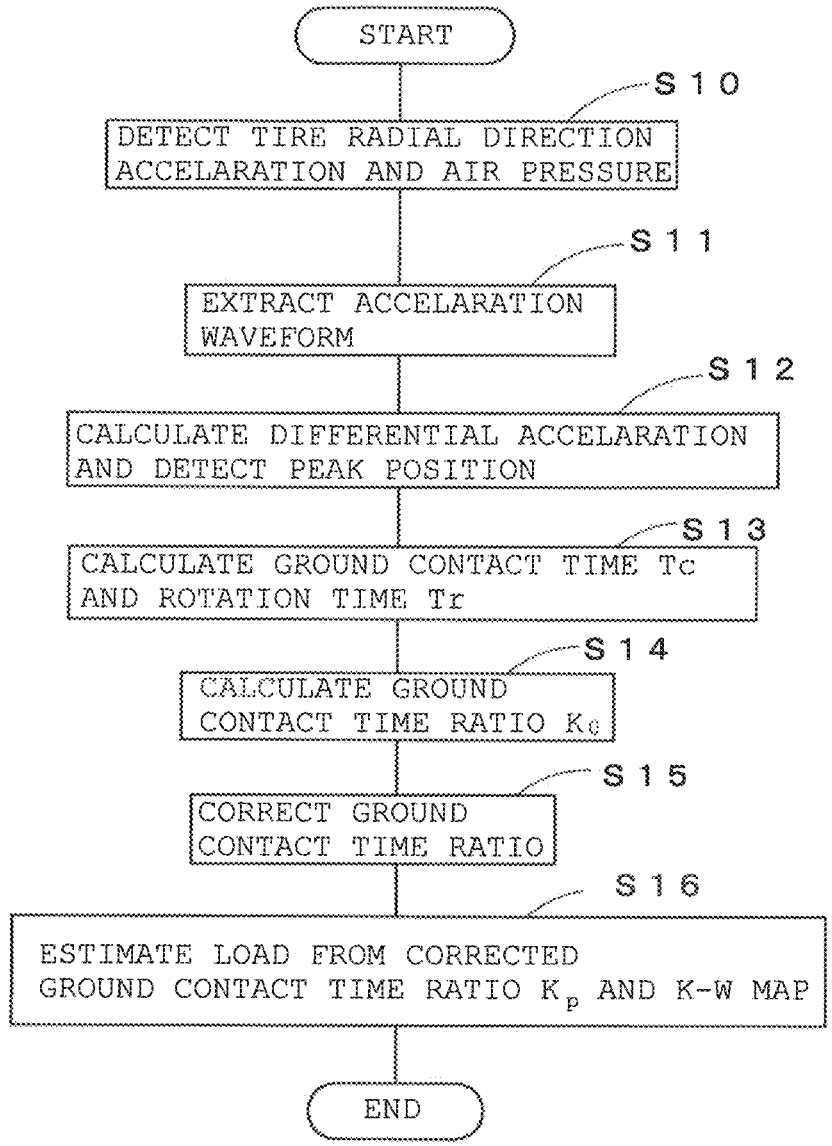
FIG. 8 is a flowchart of a tire load estimation method according to the first embodiment.

Next, a method for estimating a load acting on the tire 1 using the tire load estimation device 10 will be explained with reference to a flowchart of FIG. 8.

First, a tire radial direction acceleration at the inner side of an inner liner part 2, which deforms along deformation of a tire tread 3, is detected and the air pressure P is measured by the pressure sensor 12, and the detected tire radial direction acceleration and the measured air pressure P are transmitted from the transmitter 7 to the storage/computing part 10B disposed on the vehicle body side (Step S10).

The storage/computing part 10B extracts the acceleration waveform from signals continuously outputted from the acceleration sensor 11 and representing the magnitude of the tire radial direction acceleration acting on the tire tread 3 (Step S11).

Next, the extracted acceleration waveform is time-differentiated to obtain a differential acceleration waveform, and thereafter the peak position on the leading edge $E_f$ side and the peak position on the trailing edge $E_k$ side, and the peak position on the trailing edge $E_k$ side after one rotation of the tire 1 are detected (Step S12).

Then, the ground contact time $T_c$ is calculated from the time interval between the peak position on the leading edge $E_f$ side and the peak position on the trailing edge $E_k$ side, and the rotation time $T_r$ is calculated from the time interval between two adjacent peak positions on the trailing edge $E_k$ side (Step S13), and thereafter the ground contact time ratio $K_0=T_c/T_r$, which is a ratio of the ground contact time $T_c$ to the rotation time $T_r$ is calculated (Step S14).

Next, the calculated ground contact time ratio K is corrected using the air pressure P measured by the pressure sensor 12 (Step S15). The corrected ground contact time ratio $K_p$ is calculated by the equation $K_p=K-m(P-P_0)$.

Finally, by using the corrected ground contact time ratio $K_p$ and the K-W map 18M representing the relationship between the previously obtained ground contact time ratio K and the load acting on the tire, the load $W_p$ acting on the tire 1 is estimated (Step S16). Specifically, an intersection point of the straight line, shown as the broken line in FIG. 7, representing the relationship between the ground contact time ratio K and the load W acting on the tire and the straight line $K=K_p$ becomes the estimated load $W_p$ when the air pressure is P.

Although the correction by the air pressure P is not an essential matter, as in the present embodiment, when the corrected ground contact time ratio $K_p$ is used, the accuracy of estimation of the load can be further enhanced.

In the first embodiment, the corrected ground contact time ratio $K_p$ and the K-W map 18M are used to estimate the load $W_p$ acting on the tire. However, by obtaining in advance a map (K-P-W map) representing a relationship among the ground contact time ratio K, the air pressure P and the load W, the load acting on the tire may be estimated directly from the calculated ground contact time ratio $K_0$ and the air pressure P.

As the K-P-W map, the linear line representing the relationship between the air pressure P and the ground contact time ratio K shown in FIG. 6 may be used to plot plural lords $W_k$ (k=1–n), for example. That is, the K-P-W map may be obtained by plotting, in FIG. 6, plural linear lines ($K_{pw}=K_{0w}-m(P-P_0)$) obtained for each $\Delta W=200$ Kg within a range W=600 Kg to 2600 Kg, for example. When the calculated ground contact time ratio is $K_s$ and the measured air pressure is $P_s$, the load on a straight line passing through the intersection of the straight line $K=K_s$ and the straight line $P=P_s$ of the K-P-W map may be determined as the estimated load Ws. In a case where the intersection of the straight line $K=K_s$ and the straight line $P=P_s$ is present between the two straight lines, the estimated load Ws may be obtained by an interpolation method or the like.

Second Embodiment

Figure 9A:
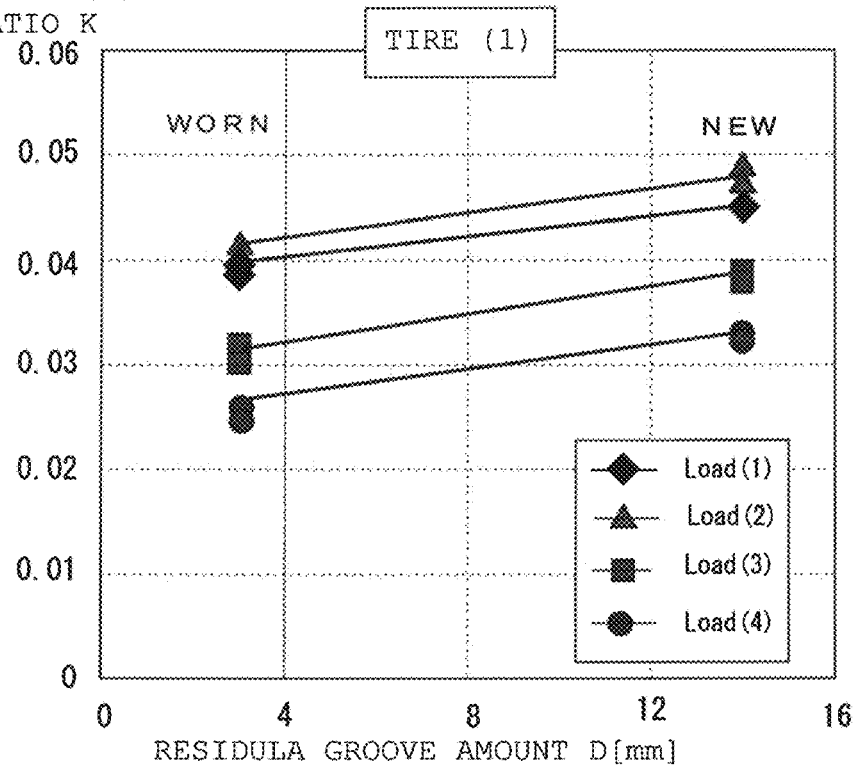
FIGS. 9A and 9B are diagrams each illustrating a relationship among a ground contact time ratio, a residual groove amount and a load.
Figure 9B:
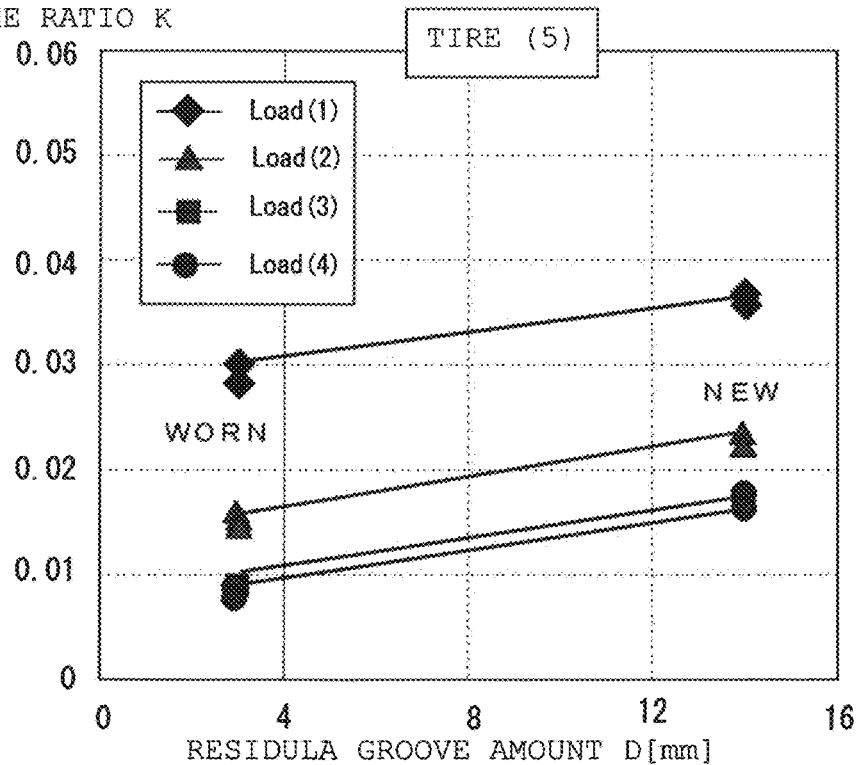

In the first embodiment, the calculated ground contact time ratio $K_0$ is corrected by the air pressure P, however, as illustrated in FIGS. 9A and 9B, since the ground contact length (the ground contact time ratio K) depends also on the wear amount, when the calculated ground contact time ratio $K_O$ is corrected by the wear amount, the lord estimation accuracy can be further enhanced. In the second embodiment, the residual groove amount is used in place of the wear amount of the tire 1.

Figure 10:
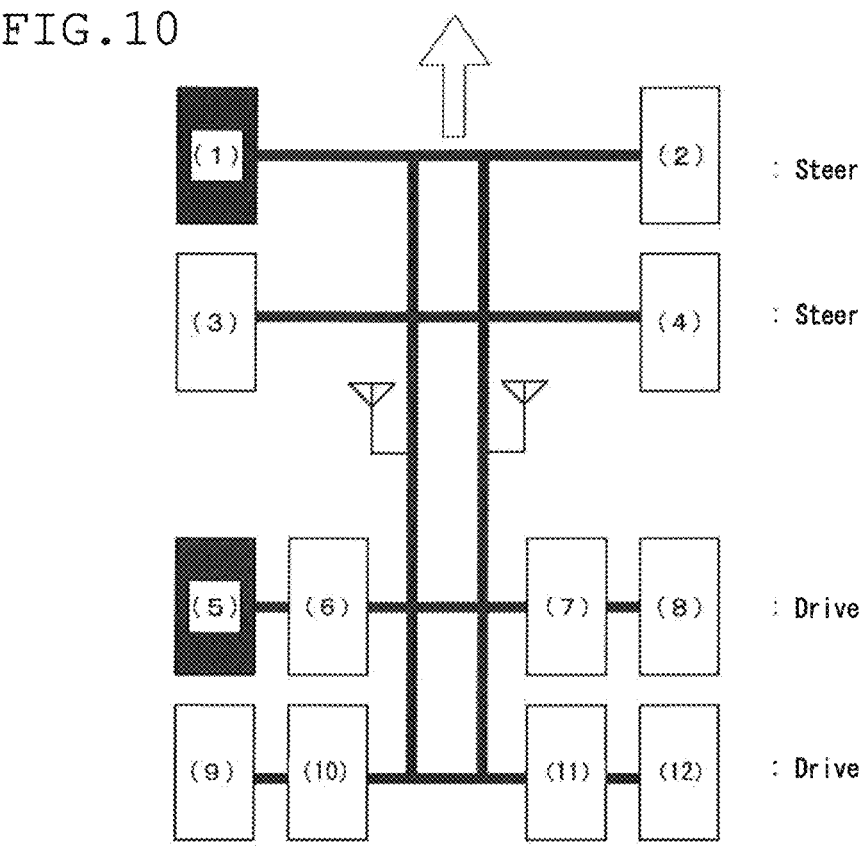
FIG. 10 is a diagram illustrating mounting positions of tires.

FIG. 10 illustrates the mounting positions of tires.

Generally, the load acting on the tire differs depending on the mounting position even if the loaded load is the same, thus in the second embodiment, for a tire mounted on a steering shaft which is a front wheel of a large truck (hereinafter referred to as a tire (1)) and an outer tire (hereinafter, referred to as a tire (5)) of the tires mounted on a drive shaft which is a rear wheel, the relationship between the residual groove amount and the ground contact time ratio K is examined. Tire dimensions are all 245/70R19.5.

Figure 11A:
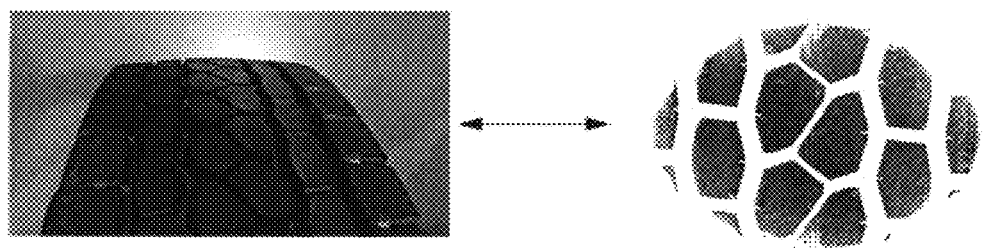
FIGS. 11A and 11B are diagrams respectively illustrating a ground contact state of a new tire and a ground contact state of a worn tire.
Figure 11B:
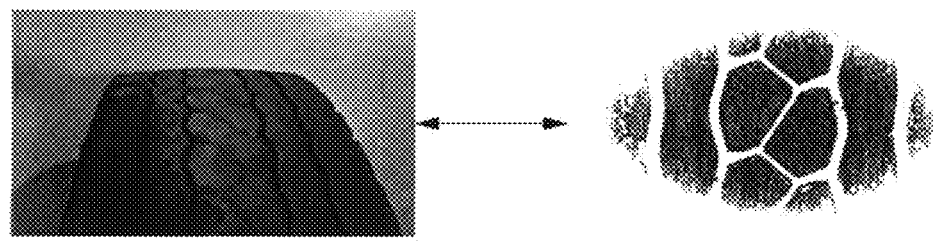

Note that "NEW" in FIGS. 9A and 9B indicates the tire having a residual groove amount of 14 mm as shown in FIG. 11A, and "WORN" in FIGS. 9A and 9B indicates the tire having a residual groove amount of 3 mm as shown in FIG. 11B. The parts (a) and (b) of the below Table 1 show loads acting on the tires (1) and (5).

TABLE 1

| (a) Load condition [kg] | | (b) Load condition [kg] | |
| --- | --- | --- | --- |
| Tire(1) | Tire(5) | Tire(1) | Tire(5) |
| NEW(1) 2100 | 1676 | WORN(1) 2175 | 1750 |
| NEW(2) 2350 | 875 | WORN(2) 2300 | 1000 |
| NEW(3) 1700 | 575 | WORN(3) 1650 | 625 |
| NEW(4) 1450 | 5750 | WORN(4) 1400 | 600 |

In the parts (a) and (b) of the above Table 1, NEW (1) to NEW (4) and WORN (1) to WORN (4) represent loads loaded on the vehicle and the Load represents the actual measured values of the magnitude (Kg) of the loads acting on the tires (1) and (5).

As is clear from FIGS. 9A and 9B, when the residual groove amount is large, the ground contact time ratio is also large. This is because the tread rigidity becomes higher with the worn tire (WORN) having a small residual groove amount, compared with a new tire (NEW) having a large residual groove amount. This result corresponds to the footprints of the tire having the residual groove amount of 14 mm and the tire having the residual groove amount of 3 mm, as shown in the right side of FIGS. 11A and 11B.

In addition, since the slope m' of the upward straight line representing the relationship between the residual groove amount D and the ground contact time ratio K is substantially constant regardless of the lord amount, as similar to the case of the air pressure P, the calculated ground contact time ratio $K_O$ can be corrected using the following equation (2).

$$K_M = K_0 + m'(D - D_0), m' > 0 \quad (2)$$

Here, $D_0$ is a groove depth of a new tire.

The lord acting on the tire may be estimated, by obtaining in advance a map (K-D-W map) representing the relationship among the ground contact time ratio K, the residual groove amount D and the load W, and using the calculated ground contact time ratio $K_0$, the residual groove amount D, and the K-D-W map. As the K-D-W map, for example, those shown in FIGS. 9A and 9B may be used.

Furthermore, since the K-D-W map differs depending on the mounting position of the tire, it is preferable to prepare a K-D-W map for each of the mounting positions of the tire.

With respect to the wear amount or the residual groove amount, a conventional method may be used to estimate the wear amount of the tire as disclosed in Japanese patent application laid-open No. 2013-169816, for example, in which the calculation of a pre-step-in band value P which is the magnitude of a vibration level before step-in calculated from the pre-step-in region (a region before the leading edge $E_F$) of the acceleration waveform shown in FIG. 3A, and a differential peak value V which is the magnitude of a peak of the differential acceleration waveform and which appears at the ground contact end shown in FIG. 3B is repeated a plurality of times to calculate the differential peak average value $V_{i-av}$ which is an average of the differential peak values. Then, an approximate line representing the relationship between the pre-step-in band value P and the differential peak average value $V_{i-av}$ is obtained, and from the approximate line, a reference differential peak value $V_k$ which is a differential peak value corresponding to a preset reference pre-step-in band value $P_k$ is calculated. Thereafter, the wear amount of the tire is estimated from a V-M map representing the relationship between the reference differential peak value $V_k$ and the wear amount M of the tire.

In the first and second embodiments, the calculated ground contact time ratio $k_0$ is corrected by the air pressure P or the residual groove amount D, however, when the calculated ground contact time ratio $K_0$ is corrected by using both the air pressure P and the residual groove amount D, the load estimation accuracy can be further enhanced.

Figure 12:
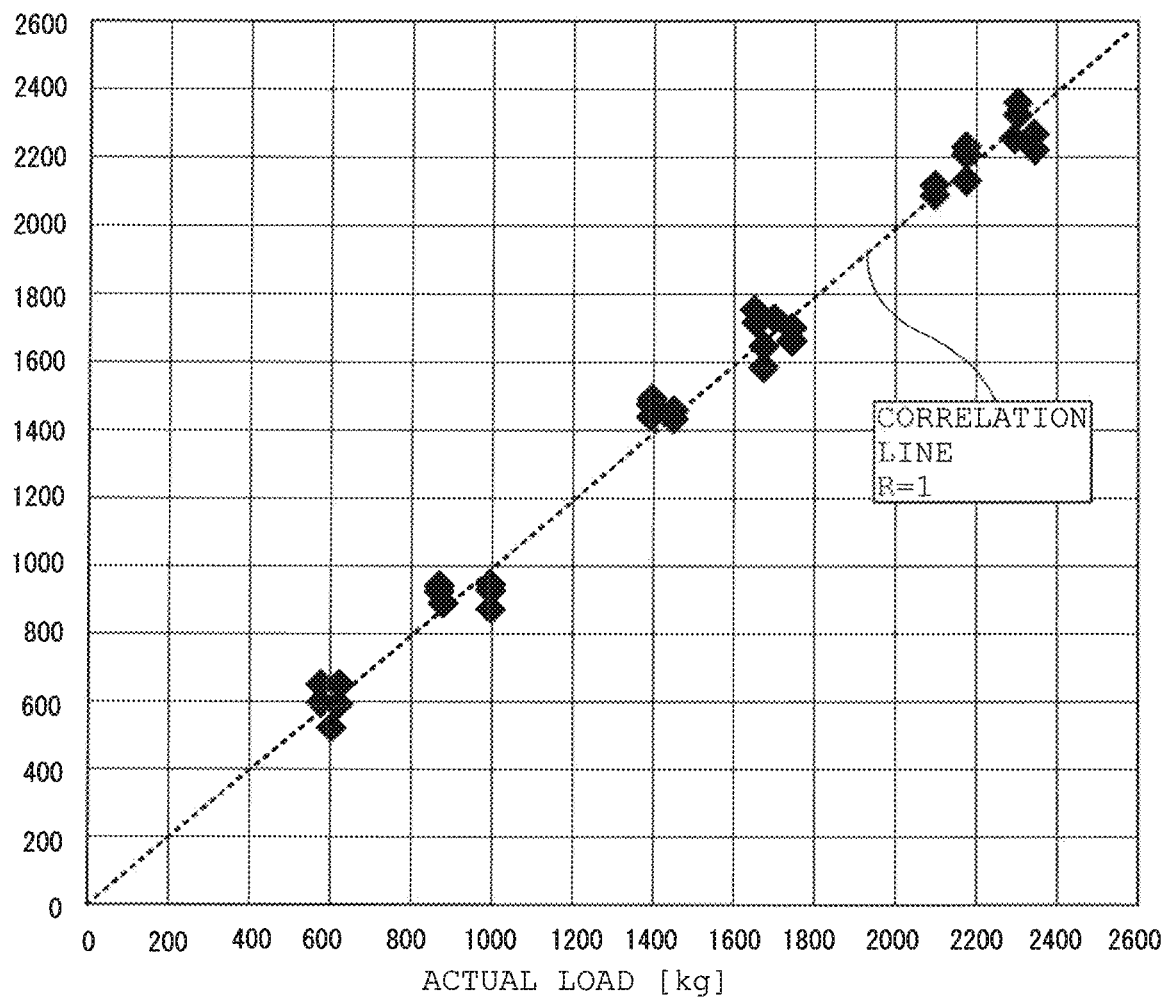
FIG. 12 is a diagram illustrating a load estimation result according to the present invention.

FIG. 12 illustrates a relationship between the actual load and the estimated load estimated by using the tire load estimation device 10 according to the present invention, and, as shown in FIG. 12, the estimated load and the actual load have a correlation coefficient R of approximately 1. Accordingly, it is understood that the load acting on the tire can be accurately estimated by using the present invention.

The present invention relates to a method for estimating a load acting on a tire, including: a step of detecting an acceleration waveform of the tire in a tire radial direction from an output of an acceleration sensor disposed on an inner surface side of a tire tread; a step of differentiating the acceleration waveform in the tire radial direction to obtain a differential acceleration waveform; a step of calculating a ground contact time and a rotation time of the tire from the differential acceleration waveform; a step of calculating a ground contact time ratio which is a ratio between the ground contact time and the rotation time; and a step of estimating the load acting on the tire from the calculated ground contact time ratio.

In this way, as the load acting on the tire is estimated from the ground contact time and the rotation time calculated using the tire radial direction acceleration waveform detected from the output of the acceleration sensor, the load acting on a tire can be estimated accurately with a small number of sensors.

Further, a step of detecting an internal pressure of the tire is provided, and based on the calculated ground contact time ratio and the detected internal pressure, the load acting on the tire is estimated, so that the load estimation accuracy can be further improved.

At this time, a map representing a relationship among the ground contact time ratio, the internal pressure of the tire and the load acting on the tire is obtained in advance, and in the step of estimating the load, the load acting on the tire is estimated from the calculated ground contact time ratio, the detected internal pressure of the tire and the map, the calculated ground contact time ratio is corrected by the detected internal pressure, and the load acting on the tire is estimated from the corrected ground contact time ratio, hence the load acting on the tire is reliably estimated.

The calculated ground contact time ratio may be corrected by the detected internal pressure, and the load acting on the tire may be estimated from the corrected ground contact time ratio.

Further, the step of estimating a wear amount of the tire is provided, and in the step of estimating the load, the calculated ground contact time ratio is corrected by the estimated wear amount, and the load acting on the tire is estimated from the corrected ground contact time ratio, hence the influence by the wear of the tire can be reduced.

The present invention also relates to a tire load estimation device for estimating a load acting on a tire, which includes: an acceleration sensor disposed on an inner surface side of a tire tread and configured to detect acceleration of a tire in a tire radial direction; an acceleration waveform extracting means that extracts an acceleration waveform in the tire radial direction including a vicinity of a contact patch, from an output signal of the acceleration sensor; a differential computing means that differentiates the acceleration waveform in the tire radial direction to obtain a differential acceleration waveform; a peak position detecting means that detects a leading edge side peak position and a trailing edge side peak position, which appear in the differential acceleration waveform and which are peak positions of two ground contact ends; a ground contact time calculation means that calculates a ground contact time which is an interval between the leading edge side peak position and the trailing edge side peak position; a rotation time calculation means that calculates a rotation time which is a time when the tire is rotated by one rotation from an interval between two adjacent leading edge side peak positions in the radial direction acceleration waveform or from an interval between two adjacent trailing edge side peak positions in the radial direction acceleration waveform; a ground contact time ratio calculation means that calculates a ground contact time ratio which is a ratio between the calculated ground contact time and the rotation time; an internal pressure detection means that detects an internal pressure of the tire; a storage means that stores a map representing a relationship among the ground contact time ratio, the internal pressure of the tire and the load acting on the tire; and a load estimation means that estimates the load acting on the tire from the calculated ground contact time ratio, the detected internal pressure of the tire and the map.

By employing such a configuration, a highly accurate tire load estimation device can be realized.

In addition, a ground contact time ratio correction means that corrects the calculated ground contact time ratio by the detected internal pressure may be provided, and the load estimation means may be configured to estimate the load acting on the tire from the corrected ground contact time ratio.

Further, a wear amount estimation means that estimates a wear amount of the tire may be provided, and the load estimation means may be configured to correct the calculated ground contact time ratio by the estimated wear amount, and estimate the load acting on the tire using the corrected ground contact time ratio, hence the influence of wear of the tire can be reduced.

DESCRIPTION OF REFERENCE NUMERALS

1: Tire, 2: Inner liner part, 3: Tire tread, 4: Center part, 5: Wheel rim, 6: Tire air chamber, 7: Transmitter, 10: Tire load estimation device, 10A: Sensor part, 10B: Storage/computing unit, 11: Acceleration sensor, 12: Pressure sensor, 13: Acceleration waveform extraction means, 14: Differential acceleration waveform computing means; 15 Peak position calculation means, 16 Ground contact time ratio calculation means, 16*a*: Ground contact time calculation part, 16*b*: Rotation time calculation part, 16*c*: Ground contact time ratio calculation part, 17: Ground contact time ratio correction means, 18: storage means, 18M: K-W map, 19: Load estimation means.

The invention claimed is:

1. A tire load estimating method comprising:
    a step of detecting an acceleration waveform of a tire in a tire radial direction from an output of an acceleration sensor disposed on an inner surface side of a tire tread;
    a step of differentiating the acceleration waveform in the tire radial direction to obtain a differential acceleration waveform;
    a step of calculating a ground contact time and a rotation time of the tire from the differential acceleration waveform;
    a step of calculating a ground contact time ratio which is a ratio between the ground contact time and the rotation time; and
    a step of estimating a load acting on the tire from the calculated ground time ratio.

2. The tire load estimating method according to claim 1, further comprising a step of detecting an internal pressure of the tire,
    wherein in the step of estimating the load, the load acting on the tire is estimated from the calculated ground contact time ratio and the detected internal pressure.

3. The tire load estimating method according to claim 2,
    wherein a map representing a relationship among the ground contact time ratio, the internal pressure of the tire and the load acting on the tire is obtained in advance, and
    wherein in the step of estimating the load, the load acting on the tire is estimated from the calculated ground contact time ratio, the detected internal pressure and the map.

4. The tire load estimating method according to claim 2,
    wherein in the step of estimating the load, the calculated ground contact time ratio is corrected by the detected internal pressure, and the load acting on the tire is estimated from the corrected ground contact time ratio.

5. The tire load estimating method according to claim 1, further comprising the step of estimating a wear amount of the tire,
    wherein in the step of estimating the load, the calculated ground contact time ratio is corrected by the estimated wear amount, and the load acting on the tire is estimated from the corrected ground contact time ratio.

6. A tire load estimating device comprising:
    an acceleration sensor disposed on an inner surface side of a tire tread and configured to detect acceleration of a tire in a tire radial direction;
    an acceleration waveform extracting means that extracts an acceleration waveform in the tire radial direction including a vicinity of a contact patch, from an output signal of the acceleration sensor;
    a differential computing means that differentiates the acceleration waveform in the tire radial direction to obtain a differential acceleration waveform;
    a peak position detecting means that detects a leading edge side peak position and a trailing edge side peak position, which appear in the differential acceleration waveform and which are peak positions of two ground contact ends;

a ground contact time calculation means that calculates a ground contact time which is an interval between the leading edge side peak position and the trailing edge side peak position;

a rotation time calculation means that calculates a rotation time which is a time when the tire is rotated by one rotation from an interval between two adjacent leading edge side peak positions in the radial direction acceleration waveform or from an interval between two adjacent trailing edge side peak positions in the radial direction acceleration waveform;

a ground contact time ratio calculation means that calculates a ground contact time ratio which is a ratio between the calculated ground contact time and the rotation time;

an internal pressure detection means that detects an internal pressure of the tire;

a storage means that stores a map representing a relationship among the calculated ground contact time ratio, the internal pressure of the tire and the load acting on the tire; and a load estimation means that estimates the load acting on the tire from the calculated ground contact time ratio, the detected internal pressure of the tire and the map.

7. A tire load estimating device comprising:

an acceleration sensor disposed on an inner surface side of a tire tread and configured to detect acceleration of a tire in a tire radial direction;

an acceleration waveform extracting means that extracts an acceleration waveform in the tire radial direction including a vicinity of a contact patch, from an output signal of the acceleration sensor;

a differential computing means that differentiates the acceleration waveform in the tire radial direction to obtain a differential acceleration waveform;

a peak position detecting means that detects a leading edge side peak position and a trailing edge side peak position, which appear in the differential acceleration waveform and which are peak positions of two ground contact ends;

a ground contact time calculation means that calculates a ground contact time which is an interval between the leading edge side peak position and the trailing edge side peak position;

a rotation time calculation means that calculates a rotation time which is a time when the tire is rotated by one rotation from an interval between two adjacent leading edge side peak positions in the radial direction acceleration waveform or from an interval between two adjacent trailing edge side peak positions in the radial direction acceleration waveform;

a ground contact time ratio calculation means that calculates a ground contact time ratio which is a ratio between the calculated ground contact time and the rotation time;

a storage means that stores a map representing a relationship between the calculated ground contact time ratio and the load acting on the tire; and a load estimation means that estimates the load acting on the tire from the calculated ground contact time ratio and the map;

an internal pressure detection means that detects an internal pressure of the tire; and a ground contact time ratio correction means that corrects the calculated ground contact time ratio by the detected internal pressure, wherein the load estimation means estimates the load acting on the tire from the corrected ground contact time ratio.

8. The tire load estimating device according to claim 6 further comprising a wear amount estimating means that estimates a wear amount of the tire, wherein the load estimating means corrects the calculated ground contact time ratio by the estimated wear amount, and estimates the load acting on the tire by using the corrected ground contact time ratio.

* * * * *